Sept. 9, 1924.
J. E. EGLESON
1,508,015
PROCESS OF DILUTING ACIDS
Filed Oct. 16, 1922
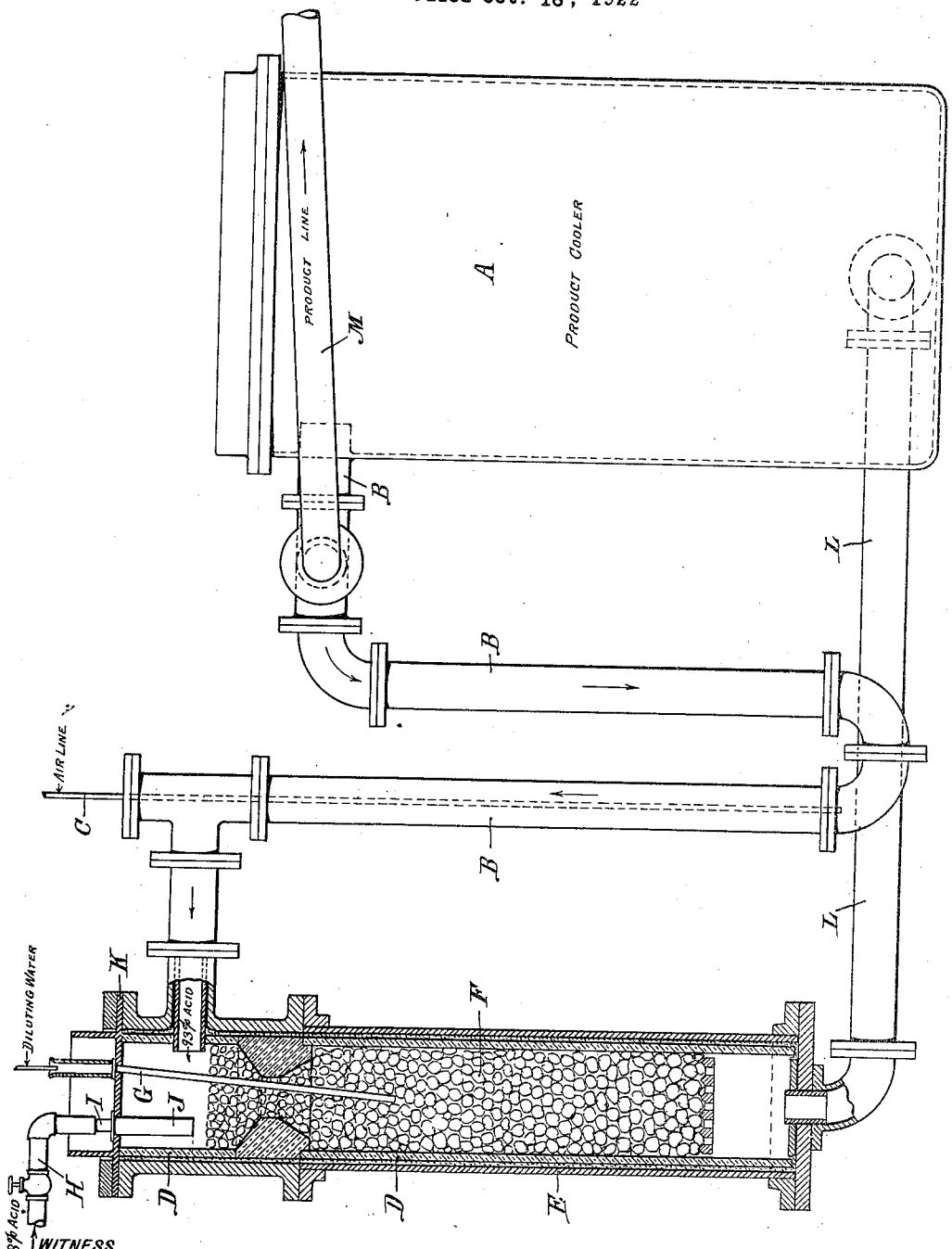
INVENTOR
JAMES E. EGLESON
BY
Briesen Schrenk
ATTORNEYS Patented Sept. 9, 1924.

1,508,015

UNITED STATES PATENT OFFICE.

JAMES ERNEST EGLESON, OF RIDLEY PARK, PENNSYLVANIA, ASSIGNOR TO GENERAL CHEMICAL COMPANY, OF NEW YORK, N. Y., A CORPORATION OF NEW YORK.

PROCESS OF DILUTING ACIDS.

Application filed October 16, 1922. Serial No. 594,732.

*To all whom it may concern:*

Be it known that I, JAMES ERNEST EGLESON, a citizen of the United States, and resident of Ridley Park, in the county of Delaware and State of Pennsylvania, have invented certain new and useful Improvements in Processes of Diluting Acids, of which the following is a specification.

This invention relates more particularly to the art of diluting strong sulfuric acid to acid of a weaker strength and the object of the invention is to conduct the diluting operation in such a manner that injurious effects on the apparatus due to the heat evolved when water or a weak sulfuric acid is added as a diluent to strong sulfuric acid, are almost entirely avoided.

It is well known that in diluting sulfuric acid considerable heat is evolved and the temperature rise causes the hot diluted acid to produce injurious effects upon materials of which the apparatus is composed, with which the hot acid comes in contact. In the practice as now generally followed, the acid and the water are simultaneously run into a conduit, which in turn dips under the surface of a rather large body of diluted acid of the strength desired, which is subjected to the cooling action of a cooling coil submerged within the body of acid. The cooled acid collects at the bottom and rises through a riser placed at the bottom of the container and running upwardly to a point somewhat higher than the egress end of the conduit which delivers strong acid and water to the body of the diluted product. The over-flow from this riser, which is effected by a goose neck contrivance, then passes on to storage. The low specific thermal capacity of the sulfuric acid, the great amount of heat evolved on mixing and the generally poor conductivity of the material of construction of which the large vessel is built all tend to a very shortened life of the conduit in which the mixing actually takes place and increased wear and tear on the walls of the vessel where this product has the highest temperature.

The present invention is intended to overcome these defects and disadvantages. The process may be conveniently carried out in the apparatus illustrated in the accompanying drawing.

The present invention is based upon the utilization of a cooled body of finished acid as an absorbent of the heat generated on dilution. By introducing this cooled body of finished product into the same vessel simultaneously with the strong acid and the diluent I succeed in restraining the temperature rise to such an extent that the effect on the materials of construction with which this acid, at the time and place of dilution, comes into contact, is so slight as to give for all practical purposes an almost unlimited life to my device when properly used.

Referring to the drawing, A represents a vessel containing a storage supply of finished product that is diluted acid of the proper strength. Within this vessel A there are cooling coils (not shown) and in this storage vessel A the capacity for cooled product is about equal to a fifty minutes' production of the mixing chamber to be described. Other proportions between the contents of the storage and the production rate of the mixing chamber may, of course, be used, and such change of proportion will necessitate the proper readjustment between the cooling capacity of the coils and the product cooler in each case. From the product cooler A the cooled finished product flows through the conduit B into the mixing chamber D, circulation being maintained by means of an air-lift, the air being supplied through the air-line C, a method which has been found to be effective and economical. The mixing chamber D is preferably constructed of porcelain. A steel shell E supporting a relatively thin porcelain cylinder D packed against the steel backing with silicate of soda and silex cement is suitable. The porcelain mixing chamber D is filled with quartz packing F and has an internal diameter of twelve inches (12") and a length of not much more than five feet. Diluting water is introduced through the conduit G which is preferably constructed of the material known as duriron. The strong acid enters the mixing chamber D through the pipe H, which, through the porcelain nipple I communicates with the interiorly lined duriron tube J. The upper part of the mixing chamber is closed by the lead top K, suitably apertured for the acid tube J and the water tube G. The strong acid and the diluent, as well as the cooled product from A are continuously fed into the mixing chamber, in regulated volume, and the diluted product flows from the bottom of the mixing chamber D into the bottom of the product cooler A through the connection L.

In the apparatus as described I have produced 93% sulfuric acid from 98% sulfuric acid at the rate of about 60 pounds per minute for which I required a mixture of approximately 90 pounds of finished product and the necessary amount of 98% acid and of water.

The surplus of finished product, in excess of what is required for storage and circulation in the apparatus as thus far described, is withdrawn through the pipe M.

Instead of mixing the strong acid and the cooled product and subsequently introducing the water, all three may meet at the same point or the strong acid may be mixed with water and very shortly thereafter flow into the circulating body of cooled product. It is best in any case to employ all three ingredients in the form of streams moving concurrently.

Cooled finished product is the only material available to be introduced into the strong acid for its dilution for absorption of the heat due to the diluting action and to prevent undue rise of temperature with its accompanying disadvantages, interruptions and defects; and it makes but little difference to the effectiveness of that cooling, in what order these three things are brought together.

Although the invention has been described with particular reference to sulfuric acid, the invention may be of use for application in other diluting operations, involving other substances that present the same problem, and it is intended that the claims, although in terms of sulfuric acid, shall include equivalents.

It will be noted that the procedure employed by me differs from standard practice mainly in preventing any deleterious heat of dilution from coming into being, whereas, according to the old practice, the heat of dilution was continuously created and attempted to be continuously withdrawn through the cooling coils. According to the new practice, the injection of a cooled body of finished product into the strong sulfuric acid when it is mixing or is about to mix or right after it has mixed with the water (the last two being adjusted in volume to make the desired finished product) serves to maintain the temperature of the mixed material at or below the temperature of the strong acid to be diluted and produces a finished product which does not possess a temperature rendering it injurious to apparatus. By cooling the outflow from the mixing chamber and returning a part of this cooled product to the diluting vessel, it is enabled to act as a heat absorber, which functions so that there is no temperature rise of any consequence when dilution takes place. The process functions continuously in exceedingly simple apparatus, the mixing device is very compact, the area of excessive corrosion is greatly reduced, an accurate control is possible and rapid replacement with repair parts, should such replacement be necessary, can easily be made.

What I claim is:

1. In the art of diluting sulfuric acid, that improvement which comprises cooling a product of dilution at a point remote from the point of dilution and then feeding the thus cooled product to the point where dilution takes place.

2. In the art of diluting sulfuric acid, that improvement which comprises setting up in a product of dilution a reduced temperature of such degree as to enable the difference between the reduced temperature and the normal temperature which the product would possess but for the said reduction of its temperature to absorb the heat of dilution produced by bringing together strong acid, a diluent and such cooled product of dilution.

3. In the art of mixing sulfuric acid and a diluent, the improvement which comprises cooling a body of finished product and bringing such cooled finished product into absorbing relation with strong acid and a diluent to maintain the temperature of the mixed material at or below the temperature of the strong acid to be diluted.

4. In the art of diluting sulfuric acid, the process which comprises co-mingling strong sulfuric acid, a diluent and a pre-cooled body of finished product, so that the temperature of the whole co-mingled material is maintained below the temperature of destructive action upon materials of construction of the mixing chamber.

5. In the art of diluting sulfuric acid, the process which comprises cooling a product of dilution at a point remote from the point of dilution, continuously feeding a portion of said cooled product of dilution to the point of dilution, and in the region of said point of dilution adding strong acid and water, returning the product of dilution thus produced to the region where the product of dilution is cooled and continuously withdrawing from the accumulating product of dilution the excess of such product over the amount thereof required for the maintenance of a proper storage supply in the system and of the requisite circulation of said product.

In testimony whereof I have hereunto set my hand.

JAMES ERNEST EGLESON.